Figure 1:
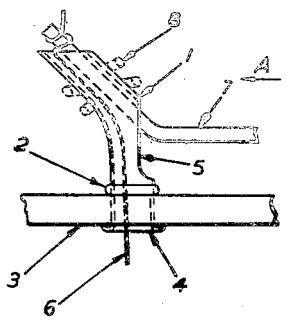

Patented Feb. 22, 1949

2,462,127

UNITED STATES PATENT OFFICE 2,462,127

MEANS FOR ELECTRICALLY CONNECTING WIRES TO TERMINALS

John Richard Pheazey and Robert James Maddock Andrews, London, England, assignors to International Standard Electric Corporation, New York, N. Y.

Application October 22, 1946, Serial No. 704,976 In Great Britain September 20, 1945

Section 1, Public Law 690, August 8, 1946 Patent expires September 20, 1965

2 Claims. (Cl. 173—324)

The invention relates to electrical connections between two or more wires such as are used in electrical equipment, and particularly, though not exclusively, in telecommunication equipment.

The term wires is to be taken to include metallic tape, tube, rod, woven wire braid, and multistranded wires.

In a very large proportion of cases these connections are made by soldering the wires to a common metallic terminal post which, while helping to ensure a strong metallic connection between the wires, also anchors them in a predetermined position. In the most usual form of terminal post each wire is soldered to it at a separate point, the post itself acting as the electrical connection between the wires, and this therefore involves a minimum of two soldered joints for each connection. Such soldered joints are usually made with a heated soldering bit, the use of which involves some skill on the part of the operator since the conditions may vary from joint to joint; this is due to varying temperatures of the soldering bit, its degree of cleanliness and freedom from oxide or "scale" and to the actual method of application of the bit to the joint.

It is vital to correct functioning of equipments including them that soldered connections as described above should be well made and therefore any lack of skill on the part of the operator constitutes a hazard to such correct functioning.

The object of the present invention is to reduce this hazard by making the operation of soldering easier, by arranging that all the wires forming a single connection shall be soldered in one joint and in one operation thus reducing the number of soldering operations and by allowing the final soldering of the connections to be effected after the electrical circuits involved have themselves been proved for correctness.

Briefly the invention achieves its objects by making use of high-frequency heating for providing the heat necessary for making the soldered joint, thus avoiding the variability occasioned by the use of an ordinary soldering bit; by providing a terminal post to which high frequency heating can be conveniently applied and at the same time allowing the wires forming the connection to be soldered in a single common joint; the method also allows for the wires to be temporarily connected for checking purposes, before final soldering.

It is possible by means of high frequency heating to fuse locally the wires together and to the terminal post, thereby eliminating the need for solder. The facility of disconnection, given by the use of solder, is usually desirable for electric wiring, but the scope of the invention covers local fusing without solder in cases where the facility of disconnection is not required.

One feature of the invention comprises a method of connecting together a plurality of wires to form an electrical connection in which the parts of the wires to be connected are electrically connected with the aid of high frequency heating.

A second feature of the invention comprises a method of connecting together a plurality of wires to form an electrical connection in which the parts of the wires to be connected are soldered together by high frequency heating.

Figure 2:
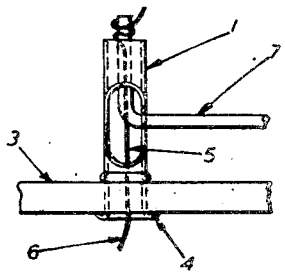

The following is a description of the invention and its method of use and is to be read in conjunction with the accompanying drawing in which Fig. 1 is a side elevation of one form of terminal post as proposed, and Fig. 2 is a front elevation of the same terminal post looking in the direction indicated by the arrow A.

Referring to Figs. 1 and 2, the terminal post comprises a metallic tube 1 provided with an extension lug 2, the lower portion of which may be of suitable tubular form for deforming over as a hollow rivet to enable the terminal post to be rigidly mounted on an insulator 3; this method of fixing is well known and is shown at 4. The insulator may, in many instances be the insulating top of an electrical component such as a coil, condenser etc. The lower end of the tube 1 is left open by the formation of the "window" 5 and the whole of the inside of the tube is coated with a layer of pure tin or tin-lead solder alloy; this coating may be applied by any convenient means such as. in the case of pure tin by electro-plating, or by "hot-dipping." Alternatively the whole terminal may be "formed-up" from a flat "blank" cut from sheet metal already coated with tin or solder alloy; such methods of manufacture would involve a longitudinal seam in the terminal, but this would not be detrimental.

In use, the terminal having been mounted on the appropriate insulator, the two or more wires which are to be electrically connected are threaded upwards through the tube 1. One wire may be a lead-out wire forming part of the coil, condenser or other component on which the terminal may be mounted, and this is shown in the sketch at 6; in such a case this wire may also conveniently be threaded through the lower portion 4 of the terminal, during the process of manufacture of the component. The other wire or wires 7, while shown in the sketch as being of much heavier gauge than the wire 6, may of course be of similar or smaller gauge. Alternatively, the wires might all be inserted through the window, or all through the hollow shank as circumstances require.

Before threading through the tube all the wires have their insulating coverings (if any) removed over such portions of their length as are to pass through the tube.

The invention can of course be applied to the connection of wires at intermediate points, or the connection of the end of one wire to an intermediate point of another wire.

After threading, all the wires are temporarily placed in electrical contact by any convenient means, as for example by twisting together the portions projecting beyond the upper end of tube 1. When all such temporary connections throughout the equipment have been made, the equipment may then be checked to prove the correctness of the connections.

The connections are then made permanent as follows: A small quantity of solder and flux is inserted in the tube 1 from the top; this solder and flux may be in the form of a short length of resin-cored solder rod of small gauge slipped into the tube alongside the wires, or may be in the form of a paste made up from powdered solder, powdered resin and a suitable solvent such as methylated spirit.

The tube 1 is then heated by means of eddy currents induced in it by high-frequency currents circulating in a small coil, shown at 8 in Fig. 1, which is slipped over the tube. The heating of the tube 1 will melt the solder and this will then bond the wires to each other and to the tube. The portions of the wires which have formed the temporary connection beyond the end of the tube, are then cut off.

The use of high-frequency currents for heating the terminal has the great advantage over the usual method of soldering with a heated soldering bit applied directly to the terminal, in that high frequency heating, as is well known may be very closely controlled by adjustment of the frequency of the currents used, the shape of the coil etc. and therefore once these are set for a particular operation, much less skill and care is required on the part of the operator, to produce a satisfactory soldered joint.

While the above description covers one specific form of the invention, other forms and variations can be devised. For example it may be desirable in some instances to make a permanent connection between the lead-out wire 6 of a component and the terminal post, during manufacture of the component and subsequently to make temporary and finally, permanent connections to the external wire or wires 7.

In this instance, solder or solder paste may be inserted through the "window" 5 after the threading of wire 6 through the lower tubular portion 4 of the terminal and the wire 6 soldered in this lower tube by eddy current heating. The surplus portion of the wire 6 which is threaded through the upper tube 1 is allowed to remain to make first a temporary, and then a final connection to the external wire to wires 7, as described above.

In some cases it may be desirable to add a further wire connection to the terminal by conventional means; the form of the proposed terminal post does not preclude this, as the additional wire may be wrapped externally round the tube 1 and soldered by conventional means.

Also, if it is necessary to break the connection between the wires at any junction, the tube 1 can be heated either by eddy currents or by applying a soldering iron to the outside of the tube and the solder melted; the wires may then be withdrawn from the tube through the window 5 and since the temporary twisted connection has been cut off in the original soldering operation, the individual wires may be separated from one another.

Where terminals have to be mounted in close proximity, such as a cluster for connection to a relay, it is desirable that the soldered connections shall be at different heights from the mounting plate so that soldering in sites is facilitated. The extension lugs 2 of the terminal posts may therefore be made of varying lengths.

What is claimed is:

1. A wire connector comprising a tubular member having means for mounting one end thereof on a base, said member having its opposite end disposed at an angle with respect to said mounting end, said member being provided with an aperture disposed on the outside of the angle and adjacent said mounting end, whereby a plurality of electrical wires may be inserted through an end of said member and through the aperture of said member together with the solder for producing a soldered joint among said wires and said member.

2. A wire connection comprising a connector having a tubular member provided with means for mounting one end thereof on an insulating base, said member having its opposite end disposed at an angle with respect to said mounting end, said member being provided with an aperture disposed on the outside of the angle and adjacent said mounting end, whereby at least a first electrical wire is introduced through the aperture in said member and extends therethrough to the end opposite said mounting and at least a second electrical wire is introduced through the mounting end of said member and extends therethrough to the end opposite said mounting end and interconnects said first wire within said member at a point adjacent the aperture in said member and at which point solder is applied to bond said wires to each other and to said member.

JOHN RICHARD PHEAZEY.
ROBERT JAMES MADDOCK ANDREWS.

REFERENCES CITED

The following references are of record in the file of this patent:

UNITED STATES PATENTS

| Number | Name | Date |
|---|---|---|
| Re. 13,219 | Chapman | Mar. 21, 1911 |
| 1,662,945 | Wielage | Mar. 20, 1928 |
| 1,698,360 | Day | Jan. 8, 1929 |
| 2,046,102 | Abbott | June 30, 1936 |
| 2,210,520 | Barry | Aug. 6, 1940 |

FOREIGN PATENTS

| Number | Country | Date |
|---|---|---|
| 246,619 | Great Britain | Aug. 7, 1925 |
| 355,189 | Great Britain | Feb. 12, 1930 |

OTHER REFERENCES

Jordan: "Better Brazed and Soldered Joints Made Possible by Induction Heating," Product Engineering, Feb. 1943, pages 102–105, particularly pages 102 and 103.